US007640161B2

(12) United States Patent
Morris et al.

(10) Patent No.: US 7,640,161 B2
(45) Date of Patent: Dec. 29, 2009

(54) WORDSPOTTING SYSTEM

(75) Inventors: Robert W. Morris, Atlanta, GA (US); Jon A. Arrowood, Smyrna, GA (US); Marsal Gavalda, Atlanta, GA (US); Peter S. Cardillo, West Stockbridge, MA (US); Mark Finlay, Tucker, GA (US); Zahi Karam, Cambridge, MA (US)

(73) Assignee: Nexidia Inc., Atlanta, GA (US)

( * ) Notice: Subject to any disclaimer, the term of this patent is extended or adjusted under 35 U.S.C. 154(b) by 22 days.

(21) Appl. No.: 11/748,319

(22) Filed: May 14, 2007

(65) Prior Publication Data

US 2007/0271241 A1 Nov. 22, 2007

Related U.S. Application Data

(60) Provisional application No. 60/800,213, filed on May 12, 2006, provisional application No. 60/799,792, filed on May 12, 2006, provisional application No. 60/800,214, filed on May 12, 2006.

(51) Int. Cl.
*G10L 13/00* (2006.01)
(52) U.S. Cl. .......................... 704/258; 704/7; 704/270
(58) Field of Classification Search ................. 704/270, 704/231, 251, 257, 258, 1, 7, 254, 255; 707/102
See application file for complete search history.

(56) References Cited

U.S. PATENT DOCUMENTS

| | | | |
|---|---|---|---|
| 6,873,993 B2 * | 3/2005 | Charlesworth et al. ...... | 707/102 |
| 7,089,188 B2 * | 8/2006 | Logan et al. ................. | 704/270 |
| 7,212,968 B1 * | 5/2007 | Garner et al. ................ | 704/251 |

* cited by examiner

*Primary Examiner*—Huyen X. Vo
(74) *Attorney, Agent, or Firm*—Occhiuti Rohlicek & Tsao LLP

(57) ABSTRACT

An approach to improving the performance of a wordspotting system includes providing an interface for interactive improvement of a phonetic representation of a query based on an operator identifying true detections and false alarms in a data set.

36 Claims, 8 Drawing Sheets

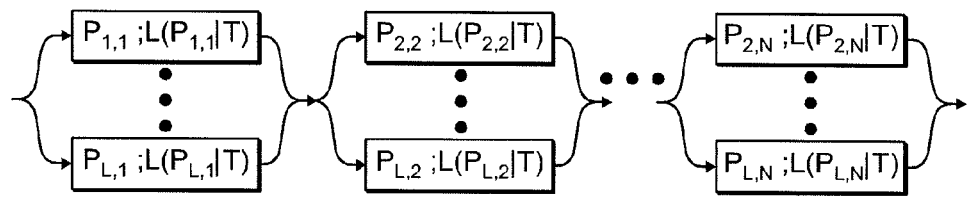
FIG. 7
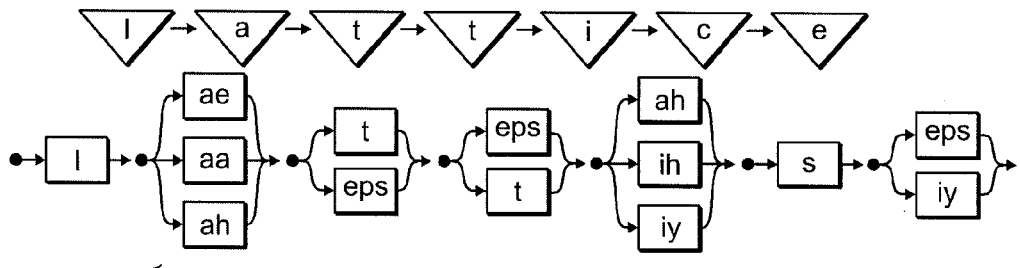
FIG. 8
| Pronunciation Alt | Score |
|---|---|
| l ae t ah s | 0.0 |
| l ae t ih s | 0.0 |
| l aa t ah s | -1.386 |
| l aa t ih s | -1.386 |
| l ae t ah s iy | -9.995 |
| l ae t ih s iy | -9.995 |
| l ae t t ah s | -10.811 |
| l ae t t ih s | -10.811 |
| l aa t ah s iy | -11.336 |
| l aa t ih s iy | -11.336 |
| l aa t t ah s | -12.197 |
| l aa t t ih s | -12.197 |
| l ae t iy s | -16.232 |
| l ah t ah s | -17.232 |
| l ah t ih s | -17.232 |
| l ae ah s | -17.436 |
| l ae ih s | -17.436 |
| ... | ... |
FIG. 9

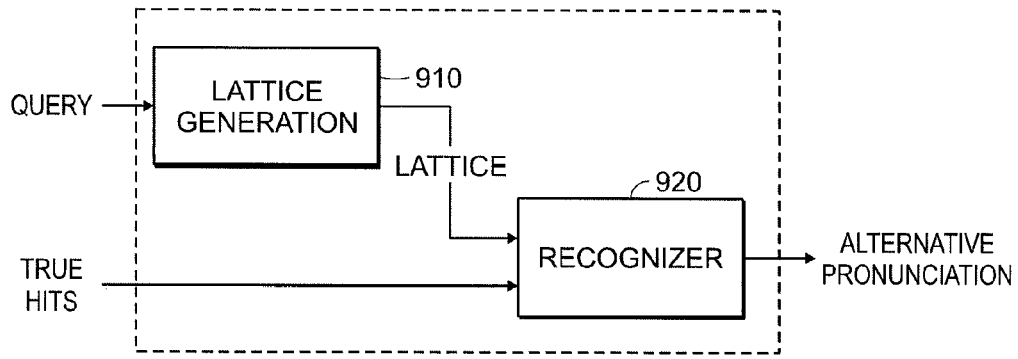
FIG. 10
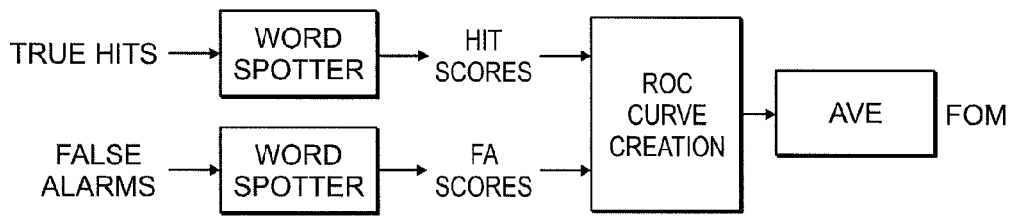
FIG. 11
$$S(KW) = L_\alpha(P_I) + L_\beta(P_N) - L_{best} + \sum_{n-1}^{N} L(P_n)$$
FIG. 12

| Phoneme | $L(P_n)$ | $T_s(P_n)$ | $T_e(P_n)$ | $D(P_n)$ | $S(P_n)$ |
|---|---|---|---|---|---|
| w | -0.6 | 1.9 | 2.3 | 0.4 | -1.5 |
| er | -0.2 | 2.3 | 2.9 | 0.6 | -0.333 |
| d | -0.5 | 2.9 | 3.1 | 0.2 | -2.5 |
| p | -0.3 | 3.1 | 3.7 | 0.6 | -0.5 |
| r | -0.1 | 3.7 | 3.9 | 0.2 | -0.5 |
| aa | -0.3 | 3.9 | 4.5 | 0.6 | -0.5 |
| s | -0.4 | 4.5 | 5.2 | 0.7 | -0.5714 |
| eh | -0.6 | 5.2 | 5.4 | 0.2 | -3.0 |
| s | -0.6 | 5.4 | 6.1 | 0.7 | -0.857 |
| ih | -0.1 | 6.1 | 6.3 | 0.2 | -0.5 |
| ng | -0.2 | 6.3 | 6.6 | 0.3 | -0.667 |

WORDSPOTTING SYSTEM

CROSS-REFERENCE TO RELATED APPLICATIONS

This application claims the benefit of the following U.S. Provisional Applications: No. 60/800,213 filed May 12, 2006, "Guided Search"; No. 60,799,792, filed May 12, 2006, titled "Display for Wordspotting"; and No. 60/800,214, filed May 12, 2006, title "Wordspotting Query Optimization." Each of these applications is incorporated herein by reference.

BACKGROUND

This invention relates to a system for wordspotting.

Analysis of audio data can be performed using wordspotting techniques in which a query defines an event to be located in an audio source, such as an archive of audio recordings or in live monitored audio. One challenge in such analysis is the specification of the query. One approach uses a phonetic representation determined from an orthographic representation of the query.

SUMMARY

In one aspect, in general, an approach to improving the performance of a wordspotting system includes providing an interface for interactive improvements of a phonetic representation of a query based on an operator identifying true detections and false alarms in a data set.

In another aspect, in general, a method for searching for audio events includes accepting a specification of a search term. A first representation of the search term is identified, and a first set of putative instances of the search term in audio data is identified according to the first representation. A second representation of the search term is then determined according to information received responsive to a presentation of the first set of instances. A second set of putative instances of the search term is identified in the audio data according to the second representation.

Aspects can include one or more of the following.

Information relating the first set and the second set of putative instances of the search term is provided.

The method includes iteratively refining a representation of the search term by repeatedly determining a further representation of the search term according to information received responsive to a presentation of putative instances determined according to a prior representation of the search term.

The specification of the search term includes a text representation of a phrase including one or more words. The text representation may include an orthographic representation.

Determining the first representation includes determining the representation in terms of subword units, for example, as a phonetic representation of the search term.

Determining the first representation includes applying at least one of a dictionary lookup and a text-to-phoneme procedure.

Identifying the first set of putative instances includes performing speech recognition on the audio data. For example, this includes performing word spotting according to the first representation of the search term. At least some processing steps of the speech recognition may be performed prior to accepting the specification of the search term. Such steps may include phoneme-based analysis of the audio data.

The method includes presenting a display of the first set of putative instances. For example, an ordered display is presented according to scores for the putative instances.

The method includes accepting an indication of accuracy for each of one or more of the putative instances. For example, the indication of accuracy includes at least one of an indication that the putative instance is a true instance and an indication that the putative instance is a false detection of the search term.

Presenting the display includes presenting audio representations of selected putative instances.

Presenting the display includes presenting a graphical representation indicating characteristics of subword units in the first representation of the search term. For example, the characteristics of subword units include match quality of the units to the audio data. As another example, the characteristics of subword units include temporal characteristics of the subword units.

Determining the second representation of the search term includes selecting the second representation of the search term from a set of multiple representations determined from the accepted specification of the search term.

Determining the second representation of the search term includes computing the second representation according to an indication of accuracy for each of one or more of the first set of putative instances.

Computing the second representation is further according to the accepted specification of the search term.

Computing the second representation includes selecting the second representation from a set of possible representations of the search term. For example, a representation that best represents putative instances indicated as being true instances of the search term is selected. As another example, a representation that provides a best performance measure according to the indications of accuracy of the putative instances is selected, e.g., the selected representation optimizes a Figure of Merit.

The method includes presenting a display of the set plurality of putative instances.

Presenting the display of the second set of instances includes presenting an association between putative instances in the second set and the first set of putative instances.

Presenting the association includes presenting a change of rank of a putative instance between use of the first representation and the second representation of the search term.

In another aspect, in general, a method for determining a representation of a search term include accepting a specification of the search term and determining a first representation of the search term. A first set of putative instances of the search term in audio data are identified according to the first representation. A display of the first set of putative instances is presented, and a second representation of the search term according to information received responsive to the presentation of the first set of instances.

In another aspect, in general, a method for displaying an instance of a search term in audio data includes determining characteristics of subword units of a representation of the search term. A set of graphical elements are presented. At least some of the graphical elements each corresponding to a different one of the subword units. The graphical elements including visual characteristics corresponding to the determined characteristics.

Aspects can include one or more of the following.

The subword units include phonemes.

Presenting the set of graphical elements includes presenting at least some graphical elements each corresponding to a word in the search term and showing membership of subword units in the word.

The visual characteristics include color associated with quality of the subword units.

The visual characteristics include dimensions of the graphical elements. For example, the dimensions are determined at least by temporal characteristics of the subword units.

Presenting the graphical elements includes presenting numerical representation of the characteristics of the subword units in association with the graphical elements.

In another aspect, in general, a system takes a query and a collection of audio examples and produces a scored list of alternative pronunciations. A query can be defined as any valid input to the word spotter. An audio example can be a temporal location in a collection of audio. The system can include one or more of the following:

Different alternative pronunciations are scored using the wordspotter.

The alternative pronunciations are generated by expanding the query into a larger lattice and performing an N-best search of this lattice.

The lattice is generated by using a confusion matrix to create alternatives to phonemes in the original query.

N-best lists are additionally reported for the individual words.

A speaker-dependent pronunciation model is created using the system.

The speaker is used to improve pronunciation of out-of-vocabulary words.

The system is used to search for examples of phrases that are partially comprehensible.

The system issued to update a lexicon.

In another aspect, in general, an approach includes the following steps. A search term is entered for searching selected target audio. Prior to searching, alternative pronunciations of the search term are presented and a selection of one of the pronunciations is accepted from a user. The target audio is then searched. Audio presentations of selected putative hits are presented to the user, and selections of true hits are accepted from the user. The results are analyzed, including one or more of displaying the results, for example, showing a graphical display of scores of subword components of the hits, and providing one or more pronunciations (e.g., an N-best list) based on the results. A selection of a new pronunciation is accepted from the user, and the audio is search again with the newly selected pronunciation. The steps of searching, analyzing, and selecting a new pronunciation may be iteratively repeated.

In another aspect, in general, an iterative approach is used to optimize a wordspotting query over target audio. The approach can include one or more of the following.

The user is presented an N-best list from the pronunciation model prior to searching.

At each iteration the user selects the true hits from presented putative hits.

At each iteration the user is provided with an N-best list of the alternate pronunciations.

At each iteration the user is presented a graphical display of the putative hits.

The approach is applied to find best pronunciations of out-of-vocabulary words.

The approach is applied to find best pronunciation of out-of-language words.

The approach is applied to find best pronunciation of consistently mispronounced words.

The approach is applied to tune search terms in languages not targeted by the wordspotter.

The approach is applied to correct lexicon errors.

the approach is applied with a disjoint development set from the ultimate target audio.

In another aspect, in general, a system includes means for performing all the steps of any of the methods set forth above.

In another aspect, in general, software stored on a computer-readable medium includes instructions for causing a data processing system to perform all the steps of any of the methods set forth above.

Advantages may be gained in situations in which a query represents a proper name, which may not be in a dictionary and in situations where queries include out-of-language words that may even contain phonemes that are not in the target language, and where a phrase may be consistently mispronounced in the audio to be searched.

A problem with some speech recognition systems, including some word spotting systems, is that that the quality of a phonetic representation of a term can greatly affect the quality of the results produced by a system. A "best" phonetic representation may depend on an umber of factors some of which may not be predicted without assessing the representation on representative audio data. For example, the dialect spoken in the audio data, acoustic characteristics of the audio data, or unexpected pronunciations of proper names may contribute to poor accuracy. An iterative and interactive query refinement procedure supported by word spotting system may provide an efficient way to refine the representation of a search term to improve accuracy significantly.

Other features and advantages of the invention are apparent from the following description, and from the claims.

DESCRIPTION OF DRAWINGS

FIGS. 5-8 are diagrams illustrating pronunciation representations.
FIG. 9 is a table.
FIGS. 10-11 are block diagrams of pronunciation determination approaches.
FIG. 12 is a diagram illustrating a scoring approach.

DESCRIPTION

Figure 1:
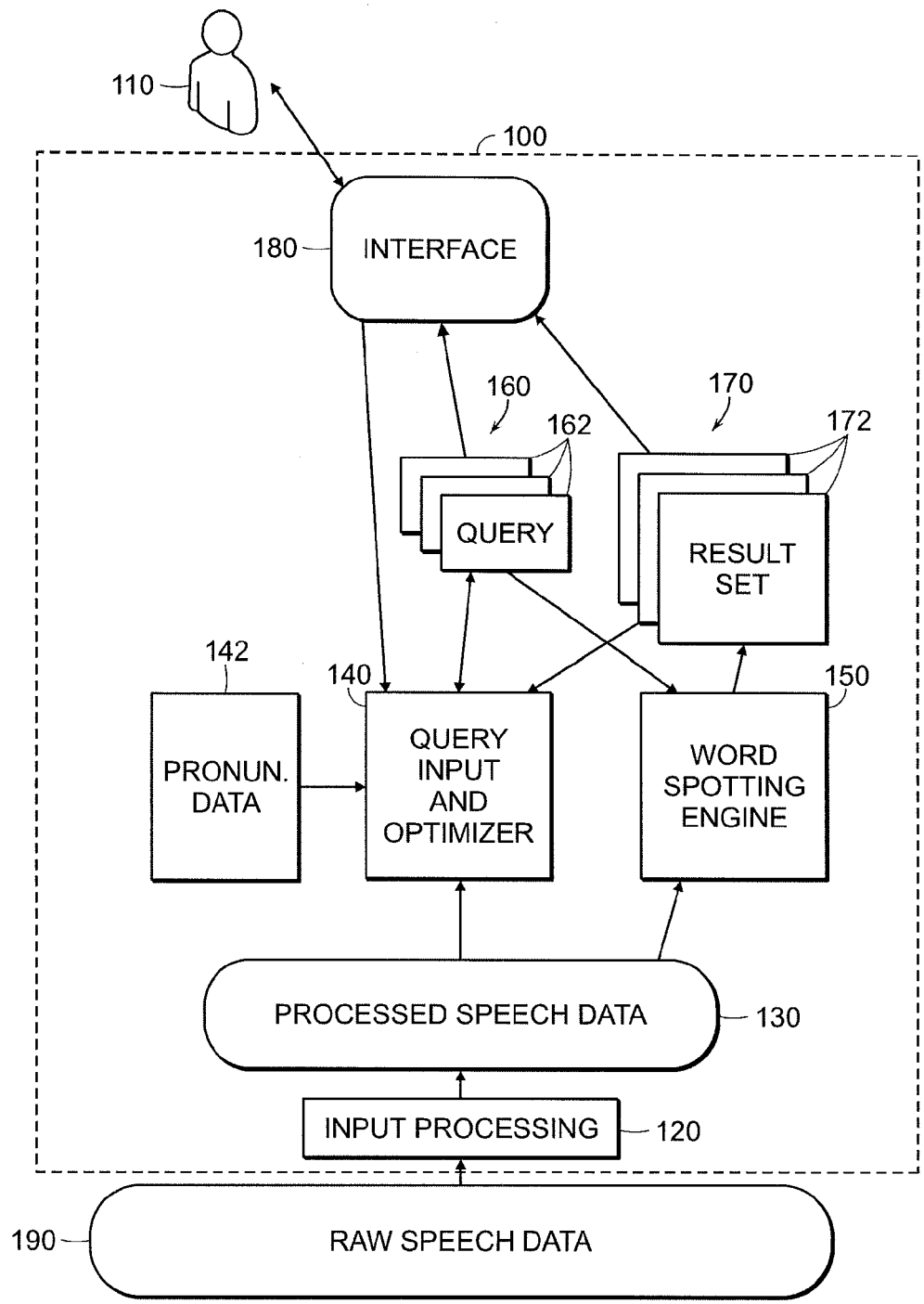
FIG. 1 is a block diagram of a word spotting system.

Referring to FIG. 1, a system 100 is used to process raw speech data 190 to locate a set of putative instances of a query (e.g., search term) in the data. In general, the query corresponds to a linguistic event, such as a word or phrase that is spoken a number of times in the data. One aspect of the system 100 is that an operator 110 can interact with the system in order to specify and refine the query in order to obtain a result set that matches the query well.

In some example, the system 100 uses a phonetically based wordspotting system to locate instances of a query in the speech data. One aspect of specification of the query that affects the characteristics or quality of the result set for the query if the pronunciation (or pronunciations) that is used for the word spotting operation. In general, the system 100 has features that permit the operator to refine (e.g., optimize) the query in an iterative manner to improve the characteristics of the result set.

In the example shown in FIG. 1, prior to attempting to locate instances of a query, the system applies an input processing 120 to the raw speech data 190 to form processed speech data 130. For example, the input processing is phonetically based and the processed speech data represents a reduction of the raw data that can be scanned more efficiently to locate instances of phonetically specified queries.

Figure 3:
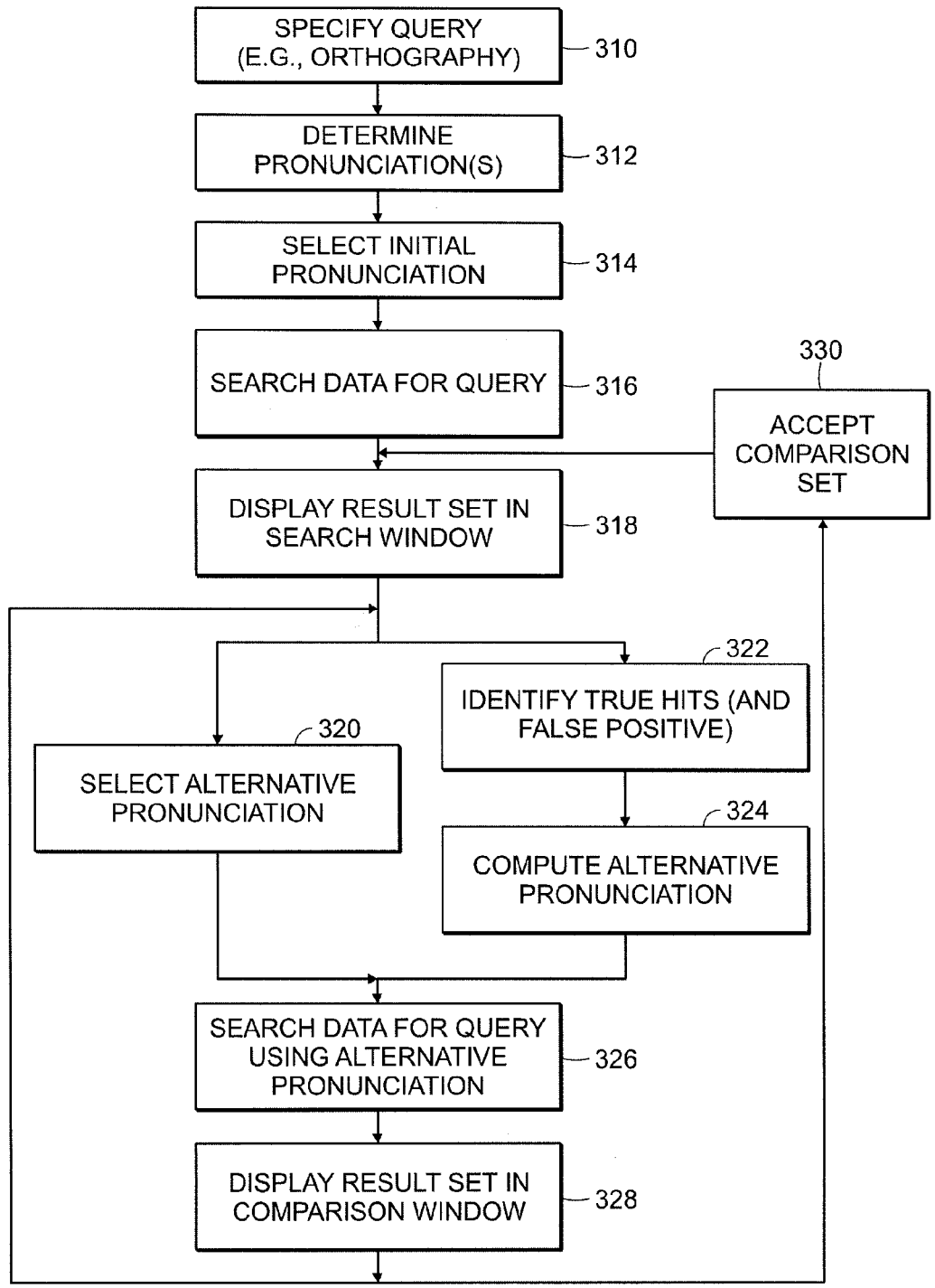
FIG. 3 is a flowchart.

Referring to the flowchart of FIG. 3, in an initial step, the operator provides a specification of a query 162 (step 310). For example, the operator may provide a spelling of a word or phrase that is desired, and a query input and optimizer component 140 of the system retrieves the phonetic representation from pronunciation data 142, such as from a dictionary and/or an automatic text-to-phoneme translation procedure (step 312). In examples in which multiple pronunciations are initially determined for the query, one initial pronunciation is selected (step 314), for example, as the most likely pronunciation selected automatically based on a probabilistic pronunciation model or based on a presentation of the alternatives to the operator with a selection of the initial pronunciation by the operator. In some examples, the initial query may be specified by the operator in additional or alternative other forms, for example, as a spoken query, as an example of the query in another audio recording, or in a phonetically-related text-based representation other than the orthographic form of the query. As an example, the operator may specify the word "Goldstein" in text (i.e., orthographic) form and the pronunciation data may provide a first pronunciation as a sequence of phonetic labels "g ow l d s t ay n".

The query 162 is provided to a word spotting engine 150, which locates a result set 172 in the processed speech data 130 corresponding to the query (step 316). This result set is presented to the operator via the interface 180, for example, in a graphical user interface (GUI) that shows the putative (e.g., presumed, possible) "hits" of the result set in a ranked order (e.g., the "best" scoring first) and provides auxiliary information about each hit and a mechanism for the operator to listen to the original recording for each hit (step 318).

In some example, the input procedure for the operator's initial query can yield a set of possible pronunciations (i.e., in step 312). For example, a dictionary may have multiple entries for a word, or a text-to-phoneme procedure may yield a list of alternative pronunciations. In such example, the operator may be given the opportunity to interactively select the particular alternative to use as the initial query 162 (in step 314). For example, the pronunciation data may further include an alternative pronunciation for "Goldstein" as "g ow l d s t iy n", for example, a similar sounding form of the word with the "ay" sound replaced by the "iy" sound.

Figure 2:
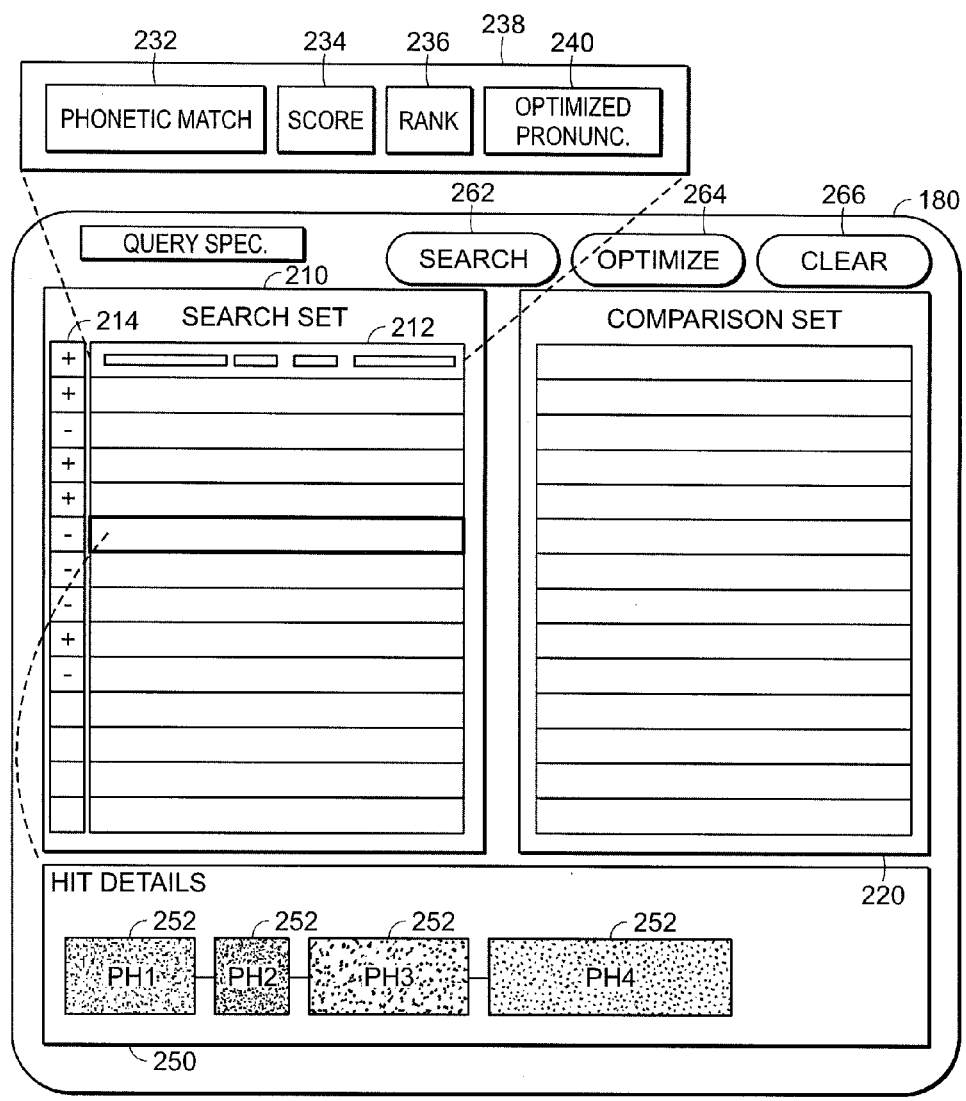
FIG. 2 is an illustration of a display.

Referring to FIG. 2, in some examples, the interface 180 includes a window for a search set 210, which includes a presentation of the result set for the current query. The search set includes representations 212, each of which corresponds to a different one of the hits. Each hit representation 212 includes a number of components. In some examples, a phonetic match 232 represents the hit as a sequence of representations of phonetic units (e.g., as text presentations of phoneme labels). A quality of match for each of the units may be shown, for example, using color (e.g., green=good match, red=poor match), or type characteristics (e.g., bold=good match, italics=poor match). Such a representation can allow the operator to select displayed hits based on the portions of the query that are well or poorly matched.

In some examples, the operator can select a hit 212 and then corresponding hit details 250 are displayed in a separate part of the interface. The hit details can include textually displayed information (e.g., time of occurrence, duration, file name) as well as graphical information. The graphical information can include a display in which each phoneme is represented by a graphical element (e.g., a rectangle), where characteristics of the rectangle represent characteristics of the detected phoneme, such as its duration in width of the rectangle, score as a color of the rectangle, and phoneme identify as a label in the rectangle. Approaches to computing such graphical representations for this or other applications is described in more detail later in this document.

As another option, the user interface allows an operator to play back portions of the audio corresponding to words or subword units displayed to the operator, for example by the operator selecting the word or unit with a mouse.

The hit representation also includes a score 234, which is a numerical representation of the quality of the hit, for example, with higher numbers representing better matches to the query. A rank 236 shows the rank index of the hit. As described below, this field is also used to show a change in rank as the query is optimized.

In one operating mode, the operator can view the result of using an alternative pronunciation for query. For example, in the case of searching for "Goldstein", the search set 210 may show the results for the first pronunciation "g ow l d s t ay n". The operator can command the system, for example, by selecting an "ALT PRONUNCIATION" button, which causes the system to select an alternative pronunciation (step 320) and form a second query 162 with the alternative pronunciation "g ow l d s t iy n" and search for a corresponding result set 172 (step 326). This result set is then displayed in the comparison set window 220 of the operator's display 180 (step 328). To show the relationship between the rankings under the two definitions of the query, a hit that was rank 4 in the search set window 210 but rank 1 in the comparison set window would have rank "4↗1" in the search set window and "1↘4" in the comparison set window. In examples where there is a list of alternative pronunciations, the operator can select from or cycle through the alternatives to select the alternative for comparison.

The operator can repeat the process of selecting alternative pronunciations (step 320) to see if a different comparison set is preferable. If the operator finds a comparison set that is better that the reference search set, the operator can accept the comparison set (step 330), and optionally can begin the process again.

Referring again to FIG. 2, the interface 180 allows the operator to mark each putative hit in the search set window 212 as either a true hit (e.g., "detection") or as false positive (e.g., "false alarm", "false positive"), for example, using a corresponding check-box 214 for each hit representation 212 (FIG. 3, step 322). The operator can leave each check-box empty, indicate that he believes the hit to be a true detection (e.g., with a "+" or a check mark), or indicate that he believes the hit to be a false positive (e.g., with a "−" or an "x"). The operator may make these determinations based on the phonetic match 232 and/or by having the system play the original acoustic recording corresponding to each hit. For example, the operator can select a representation 212 and hear the hit.

Based on the identification of true detections and, in some examples, the false positives, the system includes a query optimization procedure that computes an alternative pronunciation for the query (step 324). An example of a goal of this modification of the query includes grouping the true detections higher in the list of putative hits than the false positives. As with the selection of an alternative pronunciation described above (e.g., step 320), the system searches the data using the alternative pronunciation (step 326) and displays the comparison results (step 328), which the operator has the option of accepting (step 330) if the results are preferable to the result set.

Different examples of the system use somewhat approaches to computing the alternative pronunciation (step 324). For example, viewed as a detection system this can, for example, include selecting the alternative pronunciation based on improving the Receiver Operating Characteristic (ROC) of the system when viewed as a detector for the specified query.

In some examples, in general, the process of refining (e.g., optimizing) the phonetic representation involves taking the multiple alternative pronunciations corresponding to the query initially specified by the operator, and selecting the one that best matches the true hits that the operator identified. In some example, a discriminative approach is used in which the pronunciation is chosen that best discriminates between the true hits and the false alarms.

Figure 4:
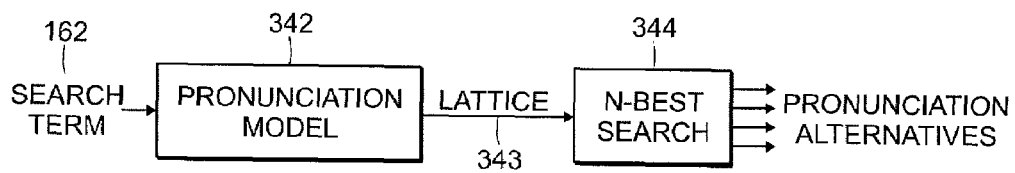
FIG. 4 is a data flow diagram.
Figure 5:
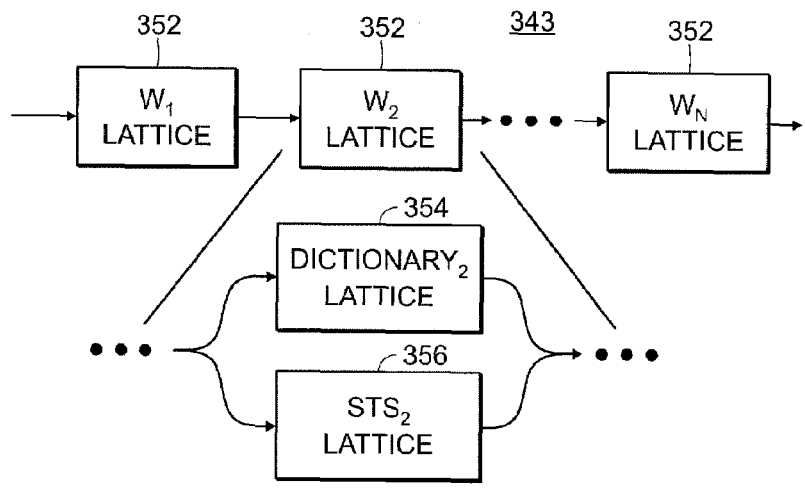
Figure 6:
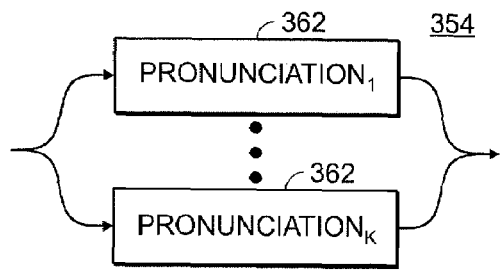

An example of determining multiple pronunciations for a query prior to using speech data (e.g., FIG. 3, step 312) is illustrated in FIGS. 4-6. As a first step, a query (search term) is applied to a pronunciation model 342 which provides a pronunciation lattice 343, and the N best paths through the lattice are determined by an N-best search 344 through the lattice. For queries that have multiple words, the lattice 343 is formed as a concatenation of separate lattices for each of the words in the query as shown in FIG. 5. For each of the one or more words in the query, the lattice 353 for that word is formed as the parallel combination of a lattice formed based on dictionary lookup 354 and a lattice 356 based on a spelling-to-sound procedure.

Referring to FIG. 5, the dictionary lattice 354 is formed by parallel paths, each corresponding to one dictionary pronunciation. Referring to FIG. 6, the spelling-to-sound lattice 356 is based on an assumption that for each letter in the search word, there are a set of alternative phonemes that the letter generates. This can include any phoneme, and "eps" (epsilon, ϵ) to represent a letter that does not emit a phoneme. Each of these alternatives is weighted by the likelihood that this phoneme is generated in the current context. When these phoneme alternatives are concatenated together, one gets the phoneme lattice as illustrated in FIG. 7.

As an example, the STS lattice 356 for the search phrase "lattice" is shown in FIG. 8, where the likelihoods have been left out for clarity. However, the alternatives are listed in descending likelihood in the figure. For example, the second 't' and the final 'e' are silent in the most likely spelling-to-sound representation.

Once the lattice is generated for the search term, an N-Best algorithm is applied. This creates a list of pronunciation alternatives, as well as a score for each entry. The N-best list for the search term "lattice" is shown in the table in FIG. 9.

In some examples of the system, a "guided search" approach is used to combine the multiple pronunciations with the examples of the query. For example, after having identified the true hits of a query in the result set, the query optimizer 140 combines the original query (e.g., the multiple pronunciations based on dictionary and spelling-to-sound rules) and the true hit of the query to choose the best pronunciation that matches both the query and the true hits.

Referring again to the flowchart in FIG. 3, a number of examples procedures to implement computing alternative pronunciations (step 324) can be used. One implementation is illustrated in FIG. 10. In this implementation, the original query is used as an input for a lattice generation 910, for example, based on the approach illustrated in FIG. 4 for yielding multiple pronunciation for a search term. The representation of the multiple pronunciations of the query and the audio examples are provided to a speech recognizer 920, which selects the best matching pronunciation as the alternative pronunciation. That is, the recognizer identifies the pronunciation that best accounts for all the true hits that are input to it.

The implementations shown in FIG. 10 is an example of a guided search approach in which an optimized query is determined by creating a query or list of queries based on optimizing the likelihood of the audio examples. If we denote each example (e.g., true hit) by $e_i$ and the input (originally specified) and output (optimized) query as $Q_{in}$ and $Q_{out}$ respectively, then a measure is given by:

$$L(Q_{out}, Q_{in}, e) = -D(Q_{out}, Q_{in}) + \sum_{m=1}^{M} l(e_{in} \mid Q_{out})$$

where $l(e|q)$ is the log likelihood of the audio example e given the query q, and $D(\ )$ is a distance measure between two queries. Under this, an optimized query can be defined by maximizing the likelihood.

$$Q_{out} = \arg\max_q L(q, Q_{in}, e)$$

As another example of this general approach, the query ($Q_{in}$) may itself be formed as a lattice representation of alternative pronunciations of the input query specification. In this example, the lattice generation step creates a more complex lattice, for example, by allowing for substitutions (e.g., according to a confusion matrix), deletions, and insertions of phonemes in the input lattice. The recognizer then outputs another lattice, for example, based on an N-best recognition of the true hits using the expanded lattice.

Another implementation uses both the indication of the true hits and the false alarms in a discriminative training approach. In some examples of this approach, the optimized pronunciation is used to find a best operating characteristic of the wordspotter, for example, based of a figure of merit (FOM) based on the ROC curve.

In some implementations of computing alternative pronunciations, a goal is to compute a query that improves the score of hits, while lowering the scores for false alarms. In some examples, this goal can be recast in terms of optimizing a Figure of Merit:

$$Q_{out} = \arg\max_q FOM(q, e, A).$$

This approach uses A, which is the audio corpus that is used to create false alarms (e.g., the false alarms that the operator marks in the interface). The pronunciation of the query is chosen to maximize the figure of merit over the audio examples and the test audio.

Note that in addition to providing a method for optimally combining text and audio searches, this method can also be used to improve the effectiveness of the wordspotter on standard text queries. During standard wordspotting, the query is created by a pronunciation model that is trained using a lexicon. The entries of this lexicon can be updated using the method described above. In this way, the pronunciation model creates phonetic strings that maximize the figure of merit for the search term instead of the actual pronunciation.

There are various options for the FOM function. One possibility is to calculate the area under the receiver operating characteristic (ROC) curve. Referring to FIG. 11, for each alternative pronunciation to be considered, false alarm scores are generated by running the wordspotting system on the audio corpus. For example, using the system in FIG. 1, the operator may mark putative hits as false alarms, and these false alarms are used for generate the false alarm scores. Alternatively, putative this in a corpus where the query is not expected to occur can be used without manual marking. The same pronunciation and wordspotter are applied to the true hits to generate the hit scores. The hit scores and the false alarm scores are then combined to create a ROC curve, which is then averaged to get the FOM score. Given a list of alternative pronunciations to consider, this procedure is repeated for each pronunciation in the list, and the best is selected as the optimized alternative pronunciation.

When search terms are particularly long, it may be desirable to modify the approach shown in FIG. 11 to computing the FOM. For example, a query $q_i$, could produce true hits that all have higher scores than nay of the false alarms, which can make it difficult to distinguish between these queries because their FOM scores are all equal. A statistical model of the false alarms scores is introduced to model the distribution of false alarm scores. This model can then be applied to create a ROC curve rather than the specific scores of the false alarms. One choice of distributions for the statistical model of the false alarms is the exponential distribution.

In another approach, rather than beginning with alternative pronunciations that are based on the initial query (e.g., ignoring positive or negative audio examples identified by the operator) and directly optimizing the FOM, a two stage approach is used. In the first stage, a set of hypothesized alternative pronunciations are determined based initial query and positive and/or negative examples marked by the operator. For example, referring to FIG. 10, the set of hypothesized alternative pronunciations may be a list of outputs from an N-best recognized that accepts the true hits and provides the top pronunciations that account for the audio examples of the marked true hits. Each of these top N hypothesized alternative pronunciations is then applied to the procedure illustrated in FIG. 11 to select the pronunciation that optimizes the FOM.

In another approach to generating hypothesized alternative pronunciations, an input pronunciation for a query is modified by substitution, or deletion of phonemes. For example, each hypothesized alternative pronunciations is an edit of the input pronunciation. The set of hypotheses consist of variations of the input pronunciation that each differs by a single insertion, deletion, or substitution. The wordspotter is then used to get scores for each initial query. The next step is a parser that constructs a phonetic lattice based on the scores form the individual hypothesized pronunciations. An N-Best algorithm is applied to this lattice to produce a new set of hypothesized alternative pronunciations. This second set of alternative pronunciations are rescored using the wordspotter, the query differences $D(q_i,Q_{im})$ are applied to these scores, and the final scores $L(q_n,Q_{in},e)$ are produced and sorted to get the output queries.

In some examples, different definitions of a FOM can be used. As another example, a different between an average score for the true hits, and an average score for a number of top scoring false alarms may be used as the FOM that is optimized over a set of hypothesized alternative pronunciations.

In examples described above, graphical representations or displays of query detections are used to provide the operator with information about characteristics of components of the query, for instance, about the score of individual components. Specific approaches to determining such displays are described below. These approaches can be used more generally than in the overall systems described above.

In some examples, a phonetic wordspotting system is based on a phonetic lattice. In this case, the score for any putative hit can be described as shown in FIG. 12. In this method $L_\alpha(P_1)$ is the log-likelihood of the shortest path form the start of the lattice to the start of the search phrase. The Viterbi log-likelihood from the end of the search phrase to the end of the lattice is denoted by $L_\beta(P_N)$ and the log-likelihood for the best path through the entire lattice is given by $L_{best}$. For the phonemes in the key word $P_n$, the individual log-likelihoods are given by $L(P_n)$. In addition, the start and end times for each phoneme are notated by $T_s(P_n)$ and $T_e(P_n)$, respectively.

Once the phonetic alignment for the putative hit has been established, the intermediate values are used for display. First, the score for each phoneme are normalized to get the phoneme duration, $D(P_n)$ and score, $S(P_n)$:

$$D(P_n) = T_e(P_n) - T_e(P_n)$$
$$S(P_n) = \frac{L(P_n)}{D(P_n)}$$

Figure 13:
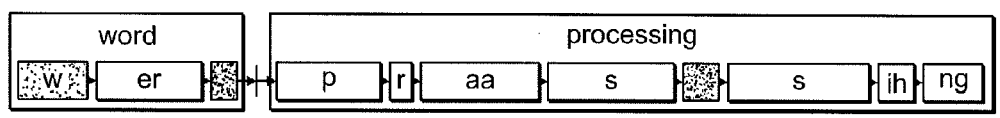
FIG. 13 is a graphical display of a detected query.

The display is constructed with the phoneme durations and scores. In some examples, the phonemes are displayed with labeled boxes that are color coded according to the phonetic score. For example, the scores are mapped to colors where 0.0 through −1.0 is represented by green, −1.0 through −2.0 is represented by yellow, and scores lower than −2.0 are represented by red. Finally, the individual words in the query are surrounded by a box that is labeled by the orthographic representation of the word. An example of the display is shown in FIG. 13.

Figure 14:
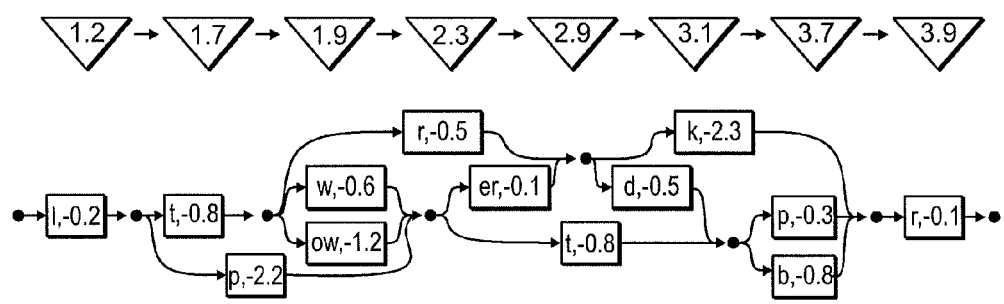
FIG. 14 is a lattice.

As an example, the results of this method of the search term "word processing" are illustrated in FIG. 14, which is represented phonetically by "w er d p r aa s eh s ih ng". In this example, this phrase occurs at time 1.9. In FIG. 14, the corresponding phonetic lattice is display. In addition, the first five phonemes of the search term are also highlighted. With the phonetic alignment found, the values for the display are then computed. These are listed in the table in FIG. 15. With the values of $D(P_n)$ and $S(P_n)$, the display is created as shown in FIG. 13.

In some examples, the wordspotting is based on a state probability implementation. In this case we denote the observations $$O=[O_1 O_2 \ldots O_T]$$

that are assigned to a putative hit. We assume that the search term consists of a sequence of states, $q_i$. We use the following notation:

$$b_i(O_t)=P(O_t|q_t=i)$$
$$a_{ij}=P(q_t=j|q_{t-1}=i)$$

Figures 15, 16:
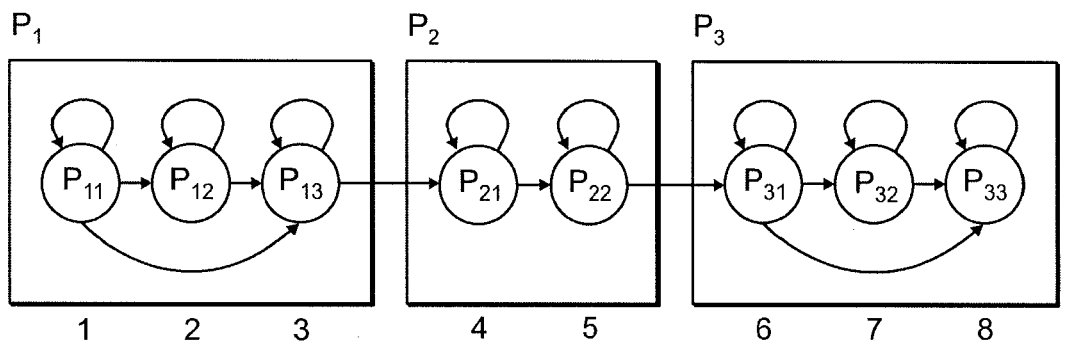
FIG. 15 is a table.
FIG. 16 is a diagram that illustrates a state transition model.

In addition, we assume that each phoneme corresponds to one or more states as shown in FIG. 16. For the purpose of notation, the jth state of phoneme i is given by $P_{ij}$ and the number of states used by phoneme i is written as $N_i$. In this diagram there are three phonemes with $N_1=3$, $N_2=2$, $N_3=3$.

One possibility for evaluating the putative hits is based on the best matching state sequence:

$$S = \max_{q_1 \ldots q_T} P(O_1 \ldots O_T, q_1 \ldots q_T)$$

This value, along with the state sequence can be calculated using the Viterbi algorithm with state sequence backtracking. The alignments for the phonemes can then be given by:

$$TS(P_i) = \min_l(q_i = P_{i1})$$

$$TE(P_i) = \max_l(q_i = P_{iN_i})$$

The scores for each phoneme are then calculated as the average log-likelihood for each $$D(P_n) = TE(P_N) - TS(P_N) + 1$$

$$S(P_n) = \frac{1}{D(P_N)} \sum_{t=TS(P_N)}^{TE(P_n)} (\log b_{q_i}(O_t))$$

The state alignment can also be calculated using a forward-backward procedure where:

$$\alpha_t(i) = p(O_i \ldots O_T, q_i = i) = \sum_{j=1}^{N} \alpha_{t+1}(j) a_{ij} b_i(O_t)$$

$$\beta_t(i) = P(O_1 \ldots O_{t-1}, q_t = i) = \sum_{j=1}^{N} \beta_{t-1}(j) a_{ij} b_j(O_{t-1})$$

$$\gamma_t(i) = P(q_t = i \mid O) = \frac{\alpha_i(i)\beta_t(i)}{\sum_i \alpha_t(i)\beta_t(i)}$$

With this information we can get the phoneme scores by taking the weighted average of the log-likelihood based on state probabilities:

$$S(P_n) = \frac{\sum_{t=1}^{T} \sum_{i=P_{N1}}^{P_{n_i}N_o} \gamma_i(i) \log b_j(O_t)}{\sum_{t=1}^{T} \sum_{i=P_{N1}}^{P_{n_n}N_n} \gamma_i(i)}$$

Aspects of the approaches above are described in the context of using phonetic subword units. In some examples, other subword units can be used. For example, arbitrarily defined units, units form other languages, or syllables can be used.

The approaches described above can be implemented in software, in hardware, or in a combination of software and hardware. The software can include stored instructions that are executed in a computing system, for example, by a computer processor, a virtual machine, an interpreter, or some other form of instruction processor. The software can be embodied in a medium, for example, stored on a data storage disk or transmitted over a communication medium.

It is to be understood that the foregoing description is intended to illustrate and not to limit the scope of the invention, which is defined by the scope of the appended claims. Other embodiments are within the scope of the following claims.

What is claimed is:

1. A computer-implemented method for searching for audio events comprising:
   accepting a specification of a search term;
   determining a first representation of the search term;
   identifying a first plurality of putative instances of the search term in audio data according to the first representation;
   determining by a processor a second representation of the search term according to information received responsive to a presentation of the first plurality of instances, wherein determining the second representation of the search term includes selecting the second representation of the search term from a plurality of representations determined from the accepted specification of the search term; and
   identifying a second plurality of putative instances of the search term in the audio data according to the second representation.

2. The method of claim 1 further comprising: providing information relating the first plurality and the second plurality of putative instances of the search term.

3. The method of claim 1 further comprising iteratively refining a representation of the search term by repeating determining of a further representation of the search term according to information received responsive to a presentation of putative instances determined according to a prior representation of the search term.

4. The method of claim 1 wherein the specification of the search term comprises a text representation of a phrase including one or more words.

5. The method of claim 3 wherein the text representation comprises an orthographic representation.

6. The method of claim 1 wherein determining the first representation includes determining said representation in terms of subword units.

7. The method of claim 6 wherein determining the first representation includes determining a phonetic representation of the search term.

8. The method of claim 6 wherein determining the first representation includes applying at least one of a dictionary lookup and a text-to-phoneme procedure.

9. The method of claim 1 wherein identifying the first plurality of putative instances includes performing speech recognition on the audio data.

10. The method of claim 9 wherein performing speech recognition includes performing word spotting according to the first representation of the search term.

11. The method of claim 9 wherein at least some processing steps of the speech recognition are performed prior to accepting the specification of the search term.

12. The method of claim 11 wherein the at least some processing steps include phoneme-based analysis of the audio data.

13. The method of claim 1 further comprising: presenting a display of the first plurality of putative instances.

14. The method of claim 13 wherein presenting the display includes displaying an ordered display according to scores for the putative instances.

15. The method of claim 13 further comprising: accepting an indication of accuracy for each of one or more of the putative instances.

16. The method of claim 15 wherein the indication of accuracy includes at least one of an indication that the putative instance is a true instance and an indication that the putative instance is a false detection of the search term.

17. The method of claim 13 wherein presenting the display includes presenting audio representations of selected putative instances.

18. The method of claim 13 wherein presenting the display includes presenting a graphical representation indicating characteristics of subword units in the first representation of the search term.

19. The method of claim 18 wherein the characteristics of subword units include match quality of the units to the audio data.

20. The method of claim 18 wherein the characteristics of subword units include temporal characteristics of the subword units.

21. The method of claim 1 wherein determining the second representation of the search term includes computing the second representation according to an indication of accuracy for each of one or more of the first plurality of putative instances.

22. The method of claim 21 wherein computing the second representation is further according to the accepted specification of the search term.

23. The method of claim 22 wherein computing the second representation includes selecting the second representation from a set of possible representations of the search term.

24. The method of claim 23 wherein selecting the second representation includes selecting a representation that best represents putative instances indicated as being true instances of the search term.

25. The method of claim 23 wherein selecting the second representation includes selecting a representation that provides a best performance measure according to the indications of accuracy of the putative instances.

26. The method of claim 25 wherein the selected representation optimizes a figure of Merit.

27. The method of claim 1 further comprising: presenting a display of the second plurality of putative instances.

28. The method of claim 27 wherein presenting the display of the second plurality of instances includes presenting an association between putative instances in the second plurality and the first plurality of putative instances.

29. The method of claim 28 wherein presenting the association includes presenting a change of rank of a putative instance between use of the first representation and the second representation of the search term.

30. The method of claim 1, wherein determining the second representation of the search term includes:
   presenting the first plurality of putative instances of the search term to a user; and
   determining the second representation of the search term according to information received from the user responsive to the presentation of the first plurality of putative instances.

31. A computer-implemented method for determining a representation of a search term comprising:
   accepting a specification of the search term;
   determining a first representation of the search term;
   identifying a first plurality of putative instances of the search term in audio data according to the first representation;
   presenting a display of the first plurality of putative instances; and
   determining by a processor a second representation of the search term according to information received responsive to the presentation of the display of the first plurality of instances, wherein determining the second representation of the search term includes selecting the second representation of the search term from a plurality of representations determined from the accepted specification of the search term.

32. The method of claim 31 further comprising: accepting an indication of accuracy for each of one or more of the putative instances.

33. The method of claim 32 wherein the indication of accuracy includes at least one of an indication that the putative instance is a true instance and an indication that the putative instance is a false detection of the search term.

34. Software stored on a computer-readable medium comprising instructions for causing a data processing system to:
   accept a specification of a search term; determine a first representation of the search term;
   identify a first plurality of putative instances of the search term in audio data according to the first representation;
   determine a second representation of the search term according to information received responsive to a presentation of the first plurality of instances, wherein the second representation of the search term is selected from a plurality of representations determined from the accepted specification of the search term; and
   identify a second plurality of putative instances of the search term in the audio data according to the second representation.

35. A system for wordspotting comprising:
   an interface;
   a processor;
   a query optimizer; and
   a word spotting engine; wherein
   the interface is configured to accept a specification of a search term; and
   the query optimizer is configured to determine a first representation of the search term;
   the word spotting engine is configured to identify a first plurality of putative instances of the search term in audio data according to the first representation;
   the interface is configured to present the first plurality of putative instances and receive information responsive to a presentation of the first plurality of instances; and
   the query optimizer is further configured to cause the processor to determine a second representation of the search term according to the information received responsive to the presentation of the first plurality of instances, wherein the second representation of the search term is selected from a plurality of representations determined from the accepted specification of the search term.

36. A computer-implemented method for searching for audio events comprising:
   accepting a specification of a search term;
   performing a first search of audio data according to a first representation of the search term to identify a first plurality of putative instances of the search term;
   determining by a processor a second representation of the search term according to an indication of accuracy for each of one or more of the first plurality of putative instances of the search term, wherein determining the second representation of the search term includes selecting the second representation of the search term from a plurality of representations determined from the accepted specification of the search term; and
   performing a second search of audio data according to the second representation of the search term to identify a second plurality of putative instances of the search term.

* * * * *